Dec. 6, 1966  W. E. DUTOT  3,289,716
ROTARY EDGE TRIMMING TOOL
Filed July 13, 1964
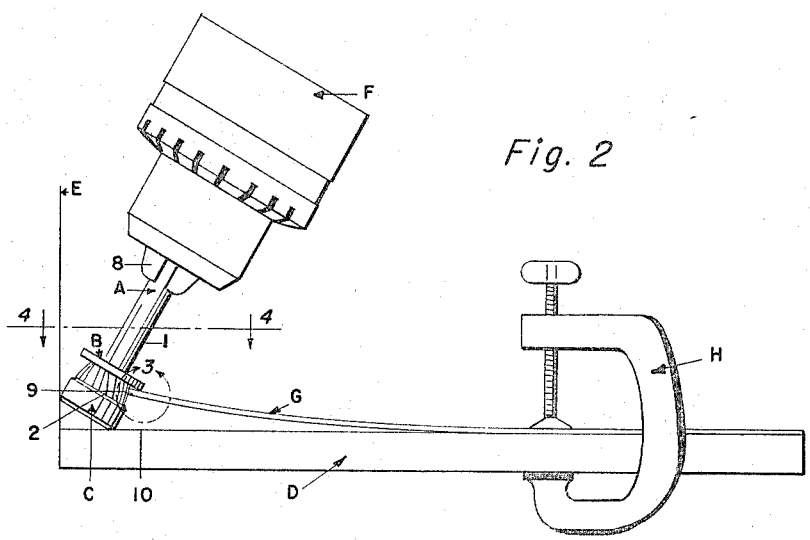
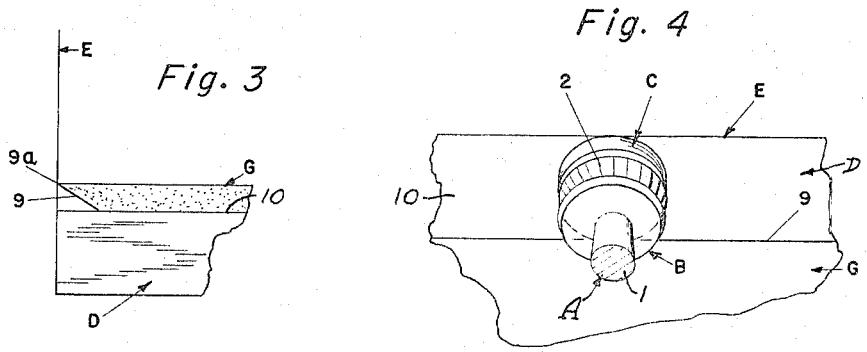
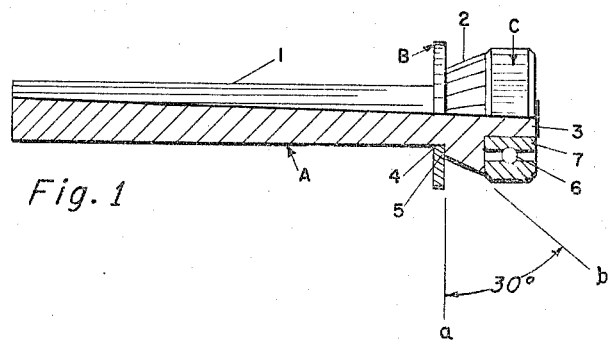
Wilbur E. Dutot
INVENTOR
By William R. Piper
ATTORNEY The present invention relates to improvements in a rotary scribing tool and it consists in the combination, construction and arrangement of parts as hereinafter described and claimed.

In the covering of a sink board with a sheet of Formica or other plastic sheet it is necessary to cut one edge of the sheet so that the entire length of the edge will contact with the back board of the sink at all points. The present method of accomplishing this is to lay the Formica sheet on the sink base board and then take calipers and position their two pointed ends about one-half inch apart. The operator then places one pointed leg of the calipers in contact with the front surface of the sink back board and at one end of the sink base board and sees to it that the other leg has its pointed end lying on an imaginary line that extends perpendicular to the back board surface. He then moves the calipers along the front surface of the back board from one end of the base board to the opposite end. During this movement he keeps one leg of the calipers in constant contact with the back board front surface and uses the other leg of the calipers to inscribe a line on the Formica sheet.

A saber saw is used for cutting the Formica sheet along the inscribed line regardless of the shape of the line. The cut edge must be hand filed because the saw will chip the Formica during the cutting process and it is necessary to eliminate the chipped portions. The filed edge must fit close to the back board. The base board then has a layer of contact cement applied thereto and the undersurface of the Formica sheet has a layer of contact cement applied thereto. When both layers of contact cement are dry to the touch, the sheet of Formica is aligned with the base board and then brought into contact therewith. The two contacting layers of cement will immediately bond for permanently attaching the Formica or other plastic sheet to the base board.

An object of my invention is to provide a rotary scribing tool that will do away with the necessity of using calipers for inscribing a line on the Formica sheet and will also do away with the necessity of hand-filing a cut edge to eliminate any chipping of the sheet along the cut edge. My rotating tool can be used for cutting an edge on the Formica sheet with the contour of this edge being identical to the contour of the front surface of the back board against which the edge contacts. To accomplish this the sheet of Formica or other plastic sheet is clamped to the base board with an edge of the plastic sheet being spaced a short distance away from the back board. My scribing tool is then mounted in the chuck of an electric motor and is positioned between the back board and the adjacent edge of the clamped plastic sheet. The rotating scribing tool has a ball bearing guide wheel of a slightly larger diameter than that of a conical cutter that forms a part of the tool. The axis of the rotating tool is inclined so that the guide wheel will contact both the front surface of the back board and the upper surface of the base board. The conical cutter will contact with the edge of the plastic sheet that is to be trimmed so that the contour of the plastic sheet edge will parallel the contour of the front face of the back board contacted by the guide wheel. A washer is mounted on the scribing tool and overhangs the conical cutter. This washer rides on top of the plastic sheet and adjacent to the edge being trimmed. The function of the washer is to hold the plastic sheet edge in continual contact with the conical cutter as the scribing tool is moved from one end of the plastic sheet to the opposite end. The plastic sheet can be cemented to the base board after the edge-trimming process is completed.

A further object of my invention is to provide a scribing tool of the class described which is simple in construction and durable and efficient for the purpose intended.

Other objects and advantages will appear as the specification continues. The novel features of the invention will be set forth in the appended claims.

Drawing

For a better understanding of my invention, reference should be made to the accompanying drawing, forming a part of this specification, in which:

FIGURE 1 is an enlarged view of the rotary scribing tool partly shown in section.

FIGURE 2 is a side elevation of the tool and is shown mounted in the chunk of an electric motor. The rotating tool is illustrated as trimming the edge of a sheet of Formica or other plastic metal.

FIGURE 3 is an enlargement of the edge of the sheet of Formica as shown in the dot-dash circle 3 in FIGURE 2. The sheet of Formica is placed on a sink table or other base and its chamfered edge contacts with the back wall of the sink or other vertical surface.

FIGURE 4 is a horizontal section taken along the line 4—4 of FIGURE 2.

While I have shown only the preferred form of my invention, it should be understood that various changes, or modifications, may be made within the scope of the annexed claims without departing from the spirit thereof.

Detailed description

In carrying out my invention I will first describe the rotary scribing tool and then will show one of its uses. The rotary scribing tool is shown on an enlarged scale in FIGURE 1 and is indicated generally at A. The tool has a cylindrical shank 1 that is one-fourth of an inch in diameter, but I do not wish to be confined to this exact measurement. The tool also has a tapered cutter portion 2 and the angle of the cutter teeth preferably is 30°. The width of the tapered cutter portion 2 is about one-eighth of an inch although this width would vary with the size of the tool being used.

The rotary scribing tool A also has an integral shaft 3 whose axis coincides with the axis of the conical or tapered cutter 2 and the shank 1. The shaft 3 is about three-sixteenths of an inch in diameter and is about one-fourth of an inch long when used on a rotary scribing tool having the particular dimensions mentioned for the shank 1 and the tapered cutter portion 2. The tool is preferably made of file steel and is case hardened.

A washer B has an opening 4 that will permit the washer to be mounted on the shank 1 with a force fit. The washer will be moved against a shoulder 5 that is formed between the tapered cutter portion 2 and the shank 1. The outer diameter of the washer is preferably one-half of an inch and the thickness is one-sixteenth of an inch. Again these measurements are for the size rotary scribing tool already described. The size of the washer may be varied according to the size of the rotary scribing tool. The washer B will rotate as a unit with the shank 1 and with the tapered cutter portion 2.

I also mount a ball bearing guide wheel C on the shaft 3. The wheel has a sealed ball bearing portion 6 and the cutter diameter of the wheel is slightly larger than the outer diameter of the largest part of the tapered cutter portion 2. The ball bearing 6 has an inner sleeve 7 that is pressed onto the shank 3 of the rotary scribing tool with a force fit and in this way the ball bearing guide wheel is held in place. The guide wheel C can rotate independently of the rotating shaft 3 when the rotary scribing tool is used.

In FIGURE 2, I show how the rotary scribing tool can be used. A base member D is indicated as having a vertical back wall E. The shank 1 of the rotary scribing tool is mounted in a chuck 8 of an electric motor indicated generally at F. The electric motor has a hand grip portion, not shown. A sheet of Formica G is placed on the base member D and its edge 9 is spaced from the vertical wall E a distance which will permit the rotary scribing tool A to be placed between the back wall E and the edge 9 in the manner shown in FIGURE 2. The axis of the electric motor F and the axis of the rotary scribing tool A are inclined from the vertical at an angle of about 20° although I do not wish to be confined to this exact angle. The tool A will have its guide wheel C contacting with the vertical back wall E and will have the guide wheel also contacting with the upper surface 10 of the base member D. The edge 9 of the Formica sheet G will be disposed under the washer B and will bear against the tapered cutter 2. The Formica sheet G is clamped in position on the base member D by one or more clamps H or the like.

The electric motor F with its rotating scribing tool A is moved along the back wall E so that the guide wheel will continually contact with this wall and at the same time will continually contact with the upper surface 10 of the base member D. In FIGURE 4, I show a horizontal view of a portion of FIGURE 2. The back wall E is indicated by a line and the guide wheel C is tangent to this wall. The edge 9 of the Formica sheet G is held down against the tapered cutter 2 by the washer B. The washer prevents the edge 9 of the plastic sheet G from moving upwardly in FIGURE 2 and freeing the edge from the cutter. The washer also prevents undue vibration of the edge of the Formica sheet. The edge 9 when trimmed by the rotating tapered cutter portion 2 will be contoured to parallel the front surface of the back wall E regardless of the particular contour of this surface because the guide wheel C will continually remain in contact with the back wall E during the entire trimming operation on the edge 9.

It will be noted from FIGURE 2 that the tapered cutter portion 2 will trim the edge 9 on a bevel. The bevelled edge 9 is shown in the enlarged section view in FIGURE 3. It will further be seen that as the axis of the rotary scribing tool A is brought more nearly into a vertical position, the more acute the angle will be formed on the bevelled edge 9. In fact only the upper corner 9a of the edge 9 will contact with the back wall E.

When the trimming operation on the edge 9 is completed, the contour of this edge will parallel the contour of the surface of the back wall E. The clamp H is now removed and a contact cement, not shown, is applied to the upper surface 10 of the base board D. Also the under surface of the Formica sheet G has a layer of contact cement applied thereto. When both of these layers of contact cement feel dry to the touch, then the operator aligns the Formica strip G with the base board D and presses the Formica sheet down upon the base board. This will bring the two layers of contact cement together and there will be an immediate bonding of the Formica sheet G to the base board D.

If a Formica sheet is to be applied to the back wall E, the same procedure can be followed in trimming the lower edge of the plastic sheet so that this edge will have a contour that will parallel the contour of the upper surface 10 of the base board D. However, if the Formica sheet G has already been secured to the base board D, then the guide wheel C will contact with the upper surface of the plastic sheet G and the rotating tapered cutter portion 2 will trim the lower edge of the Formica strip, not shown, that has been clamped to the back wall E so that the contour of the lower edge will parallel the contour of the sheet G.

No hand filing of the edge 9 of the sheet G need be done before the sheet is applied to the base board D. The high speed of the rotating tapered cutter 2 will cause the rotary scribing tool A to trim the edge 9 of the sheet G during a single movement of the tool along the edge while the tool is held in the position shown in FIGURE 2. At most it would only require two movements of the rotating tool from one end of the sheet G to the opposite end to trim the edge to the correct contour.

Although I have shown a Formica sheet G or other plastic sheet in the drawing, it is possible to use the rotating scribing tool on a sheet of plywood. In this case the tool might be made larger so as to accommodate the greater thickness of the plywood.

The washer B could have a ball bearing mounting, not shown, between it and the shank 1. This would permit the washer B to rotate independently of the tapered cutter 2. If then the scribing tool were moved along the edge 9 of the Formica sheet G, the rotation of the washer would be at a speed caused by the actual contact of the washer with the plastic sheet G and the movement of the washer along the sheet as the tapered cutter 2 trims the edge.

I claim:
1. A rotary scribing tool comprising:
    (a) a shank;
    (b) a tapered cutter integral with said shank and having its axis aligned with said shank axis; said cutter having inclined cutter teeth on its tapered periphery;
    (c) an integral shaft projecting beyond said tapered cutter and having its axis aligned with the axis of said cutter and with said shank;
    (d) a ball bearing guide wheel mounted on said shaft and having an outer diameter slightly larger than the outer diameter of said tapered cutter; and
    (e) a washer mounted on said shank and being disposed adjacent to said cutter, the outer diameter of said washer being greater than the outer diameter of said tapered cutter.
2. The combination as set forth in claim 1: and in which
    (a) said ball bearing guide wheel having an inner sleeve that has a force fit connection with said shaft for holding the wheel on the shaft; and
    (b) the opening in said washer being just large enough to cause said washer to have a force fit on said shank.

References Cited by the Examiner

UNITED STATES PATENTS

| | | | |
|---|---|---|---|
| 2,756,785 | 7/1956 | Godfrey | 144—134.5 |
| 2,872,731 | 2/1959 | Greenwood | 144—134.5 X |

DONALD R. SCHRAN, *Primary Examiner.*